United States Patent Office 3,076,289
Patented Feb. 5, 1963

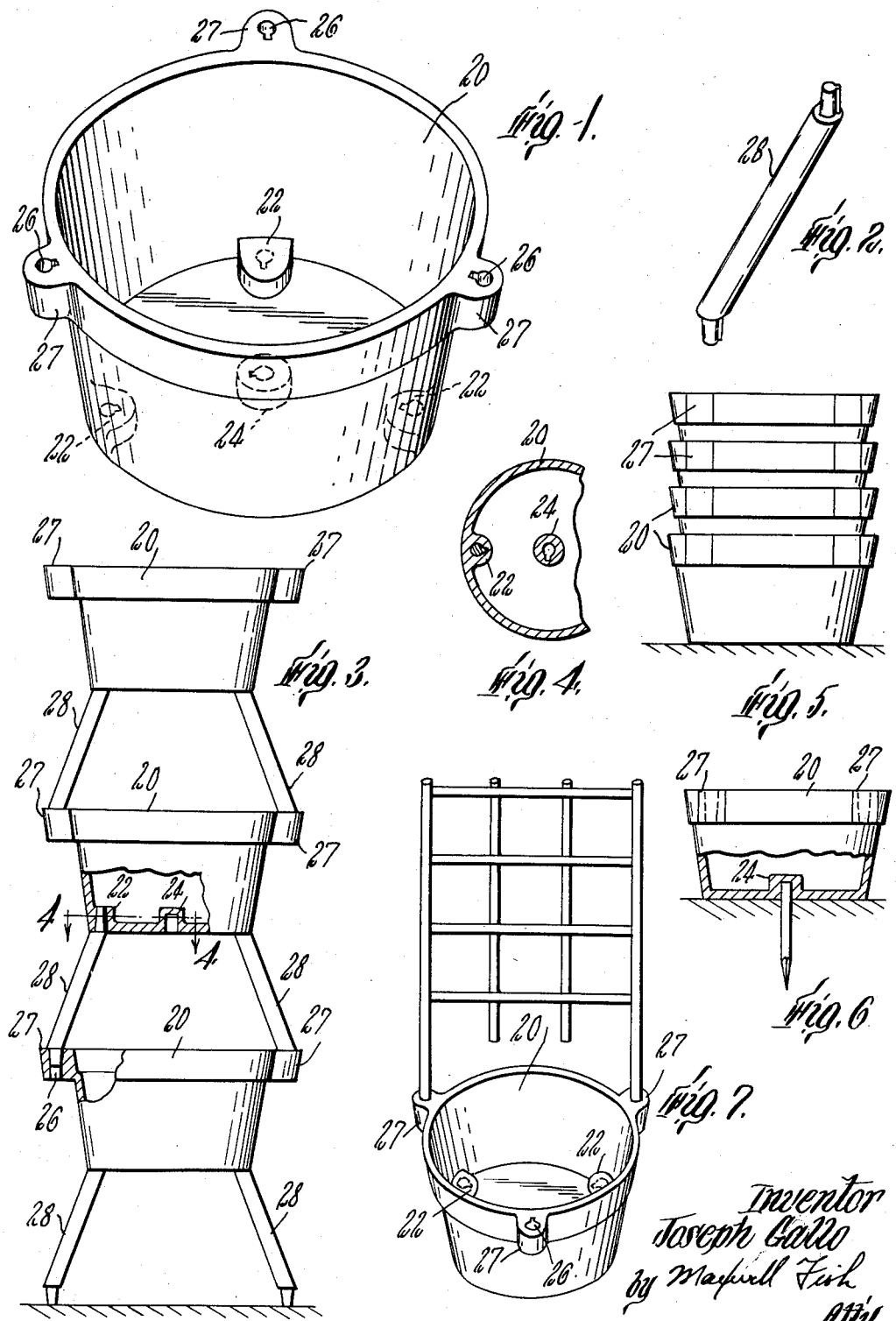

3,076,289
FLOWER POT
Joseph Gallo, 938 East St., Walpole, Mass.
Filed Apr. 28, 1961, Ser. No. 106,290
4 Claims. (Cl. 47—39)

The present invention relates to improvements in flower pots, and more particularly to an improved plastic flower pot which is adapted for nesting and which is further constructed and arranged to be supported on removable legs either individually or tiered in separated relation for the efficient growing of plants, such as bulbs for example, in a confined space.

The principal objects of the invention are to provide an improved flower pot which is more flexible as to its use than flower pots previously available on the market, which is readily nested for storage and shipping, may be readily mounted on suitable supports from the floor, or held securely on the ground by a suitably arranged spike, and which is readily tiered in separated relation one pot above another.

With these and other objects in view as may hereinafter appear, the several features of the invention will be readily understood from the following description taken in connection with the accompanying drawings in which:

FIG. 1 is a perspective view of a flower pot embodying features of the invention;

FIG. 2 is a perspective view of a leg employed in the flower pot assembly;

FIG. 3 is a view in elevation partly in section of a series of flower pots in separated tiered relation;

FIG. 4 is a fragmentary sectional plan view showing the bottom portion of the flower pot;

FIG. 5 illustrates a series of said flower pots in nested relation;

FIG. 6 is a view in side elevation, partly in section, illustrating the maner in which the flower pot may be held on the ground with a spike; and FIG. 7 is a perspective view of the flower pot with a trellis mounted thereon.

The flower pot shown in the drawings as designated at 20 is preferably made of a molded plastic material, which may be any well known plastic suitable for flower pots. The flower pot 20 as best shown in FIGS. 1, 3 and 4 has tapered sides and is molded to provide in the under surface thereof a plurality of leg receiving sockets 22. Each socket 22 is formed in a boss cast into the bottom surface of the flower pot 20. While any convenient arrangement of the sockets 22 may be employed, a preferred arrangement shown consists in the provision of three sockets at equally spaced intervals of 120° about the bottom peripheral edge of the pot and an additional centrally located socket as indicated at 24.

The pot is further provided adjacent its lip portion with externally located sockets 26 in bosses 27. As shown, three such bosses 27 are provided equally spaced from one another at intervals of 120° cast into the outer face of the pot at its upper edge or lip. Each said boss 27 is located directly over a socket 22.

The pot, or pots, as the case may be are adapted to be supported either individually or in tiers on legs 28. The legs are identical in shape, having the socket engaging portions set at an nagle so that the lower ends may be fitted into the top sockets contained in the upper bosses 26 of one pot and the upper ends may be fitted into the bottom sockets 22 of a second pot 20 in a separated tiered relation thereto. The socket entering portions of the legs 28 are formed with longitudinally extending ribs or keys which fit into keyways formed in the sockets 22 and 26, so that each leg is fixed against rotational movement in its socket. Each socket is also preferably tapered slightly along its length in order to provide a jam fit for the leg in the socket.

The flower pot assembly described is well adapted for are under a wide variety of conditions. In the first place the pot is readily nested for storage or shipping as shown in FIG. 5. The individual pot, when provided with three legs, is adapted for use in many locations, as, for example, in cemeteries which forbid the placing of flower pots or other containers on the turf. A single pot fitted with a centrally mounted spike can be pinned securely to the ground to prevent a pot located out of doors from tipping over.

FIGS. 1 and 2 illustrate the manner in which the pots may be tiered in separated relation from one another. With this arrangement a great many pots may be assembled in a confined space, as in a potting shed for starting of bulbs or seedlings.

FIGS. 4 and 5 illustrated the use of trellises which are readily mounted in one or more of the upper rim sockets 26.

The invention having been described what is claimed is:

1. A flower pot suitable for nesting and for tiering a plurality of said pots in spaced relation to one another, which comprises, in combination, a pot having a bottom surface and outwardly sloping sides terminating in a continuous rim, a plurality of bosses formed within the bottom of the pot at spaced intervals in the peripheral portion thereof and having bottom sockets opening from the bottom of the pot, and a plurality of similarly spaced bosses formed outwardly of the rim of said pot directly over said lower bosses having sockets opening from the top of the pot.

2. A flower pot suitable for nesting and for use with suitable legs having socket entering ends for tiering a plurality of said pots in spaced relation to one another, which comprises, in combination, a circular pot having a bottom surface and outwardly sloping sides terminating in a circular rim, at least three bosses formed within the bottom of the pot at equally spaced intervals in the peripheral portion thereof and having bottom sockets opening from the bottom of the pot, an additional boss and a bottom socket formed therein opening from the bottom center of the pot, and a plurality of similarly spaced bosses formed outwardly of the rim of said pot directly over said lower peripheral bosses having sockets opening from the top of said pot, said legs being keyed to said sockets so that each leg is positioned for engagement of one end thereof with the rim socket of one pot and the other end thereof with a correspondingly positioned bottom socket of the next above tiered pot.

3. A flower pot assembly suitable for nesting and for tiering a plurailty of said pots in spaced relation to one another, which comprises, in combination, a pot having a bottom surface and outwardly sloping sides terminating in a continuous rim, a plurality of bosses formed within the bottom of the pot spaced at intervals in the peripheral portion thereof and having sockets opening from the bottom of the pot, a plurality of similarly spaced bosses formed outwardly of the rim of said pot directly over said lower bosses having rim sockets opening from the top of the pot, and a series of legs shaped to fit at their lower ends into the rim sockets of a pot and at their upper ends shaped to be fitted into the bottom sockets of said pot, and further shaped to engage said ends simultaneously with the top and bottom sockets of two adjacent pots in tiered relation, said legs being keyed to said sockets so that each leg is positioned for engagement of one end thereof with the rim socket of one pot and the other end thereof with a correspondingly positioned bottom socket of the next above tiered pot.

4. A flower pot assembly suitable for nesting and for tiering a plurality of said pots in spaced relation to one another, which comprises, in combination, a plurality of identical circular pots in separated coaxially tiered relation each having a bottom surface and outwardly sloping sides termniating in a circular rim, the peripheral portion of the bottom surface of each said pot having formed at spaced intervals from one another therein sockets opening through the bottom surface of the pot, and said rim having formed therein a plurality of rim sockets opening from the top of the pot having the same relative spacing from one another to cooperate with corresponding sockets in the peripheral bottom surface of a next above tiered pot, and a series of identical legs each shaped to fit at its upper end into a bottom socket of a coaxially tiered pot and at its lower end to be fitted into a top socket of a next lower coaxially tiered pot, said legs being keyed in said sockets so that each leg is positioned for engagement of one end thereof with a rim socket of one pot and the other end thereof for engagement with a correspondingly spaced bottom socket of the next above tiered pot.

References Cited in the file of this patent

UNITED STATES PATENTS

| | | |
|---|---|---|
| 151,995 | McGuire | June 16, 1874 |
| 2,733,549 | Moore | Feb. 7, 1956 |
| 2,763,096 | Roger | Sept. 18, 1956 |

FOREIGN PATENTS

| | | |
|---|---|---|
| 18,647 | Great Britain | Sept. 18, 1901 |